US009903950B2

(12) United States Patent
Walsh et al.

(10) Patent No.: US 9,903,950 B2
(45) Date of Patent: Feb. 27, 2018

(54) MULTI-CAMERA LASER SCANNER

(71) Applicant: Leica Geosystems AG, Heerbrugg (CH)

(72) Inventors: Gregory Walsh, Walnut Creek, CA (US); Roman Parys, Rebstein (CH); Alexander Velizhev, Gallen (CH); Bernhard Metzler, Dornbirn (AT)

(73) Assignee: Leica Geosystems AG, Heerbrugg (CH)

( * ) Notice: Subject to any disclaimer, the term of this patent is extended or adjusted under 35 U.S.C. 154(b) by 685 days.

(21) Appl. No.: 14/470,088

(22) Filed: Aug. 27, 2014

(65) Prior Publication Data

US 2016/0061954 A1    Mar. 3, 2016

(51) Int. Cl.

| | |
|---|---|
| *G01S 17/89* | (2006.01) |
| *G01S 17/42* | (2006.01) |
| *G01C 15/00* | (2006.01) |
| *G01S 7/481* | (2006.01) |
| *G02B 26/10* | (2006.01) |

(Continued)

(52) U.S. Cl.
CPC ............ *G01S 17/89* (2013.01); *G01C 15/002* (2013.01); *G01S 7/4817* (2013.01); *G01S 17/023* (2013.01); *G01S 17/42* (2013.01); *G02B 26/10* (2013.01); *G03B 37/04* (2013.01); *G06T 7/55* (2017.01); *G06T 7/97* (2017.01); *H04N 1/04* (2013.01);

(Continued)

(58) Field of Classification Search
CPC ........ G01S 17/89; G01S 7/4861; G01S 17/42; G01S 7/4816; G02B 26/0833; G02B 6/06
See application file for complete search history.

(56) References Cited

U.S. PATENT DOCUMENTS

| 2003/0066949 A1 | 4/2003 | Mueller et al. |
|---|---|---|
| 2013/0093852 A1 | 4/2013 | Ye |

(Continued)

FOREIGN PATENT DOCUMENTS

| CN | 201749187 U | 2/2011 |
|---|---|---|
| CN | 102508259 A | 6/2012 |

(Continued)

OTHER PUBLICATIONS

Dennis Strelow and Sanjiv Singh, "Motion Estimation from Image and Inertial Measurements", The International Journal of Robotics Research, vol. 23, No. 12. Dec. 1, 2004. pp. 1157-1195, XP055135145, ISSN: 0278-3649, DOI: 10.1177/0278364904045593.

(Continued)

*Primary Examiner* — Luke D Ratcliffe

(74) *Attorney, Agent, or Firm* — Maschoff Brennan

(57) ABSTRACT

A device may include a laser configured to rotate about an azimuth axis of the device and an elevation axis of the device. The device may also include a plurality of cameras configured to rotate about the azimuth axis and fixed with respect to the elevation axis. The cameras may be configured to have a collective field-of-view that includes a collective elevation field-of-view and a collective azimuth field-of-view. The device may also include a control system configured to direct the laser to rotate about the azimuth axis and the elevation axis such that the laser is configured to scan a setting. The control system may also be configured to direct the cameras to each begin capturing an image of the setting at substantially the same time.

23 Claims, 10 Drawing Sheets

(51) Int. Cl.
| | |
|---|---|
| *G03B 37/04* | (2006.01) |
| *G01S 17/02* | (2006.01) |
| *H04N 1/04* | (2006.01) |
| *H04N 5/232* | (2006.01) |
| *H04N 13/02* | (2006.01) |
| *G06T 7/00* | (2017.01) |
| *G06T 7/55* | (2017.01) |

(52) U.S. Cl.
CPC ..... *H04N 5/23238* (2013.01); *H04N 13/0271* (2013.01); *H04N 13/0242* (2013.01)

(56) References Cited

U.S. PATENT DOCUMENTS

| | | | |
|---|---|---|---|
| 2014/0063489 A1 | 3/2014 | Steffey et al. | |
| 2014/0168212 A1 | 6/2014 | Jones | |
| 2015/0049329 A1* | 2/2015 | Bridges | G01B 21/047 356/51 |
| 2015/0177383 A1* | 6/2015 | Ruff | G01S 17/89 356/4.01 |

FOREIGN PATENT DOCUMENTS

| | | |
|---|---|---|
| CN | 102971657 A | 3/2013 |
| WO | WO99/06950 | 7/1997 |
| WO | 2013050576 A2 | 4/2013 |

OTHER PUBLICATIONS

Partial European Search Report for corresponding application No. EP 16 206 370.5 dated Oct. 26, 2017, pp. 1-11.

\* cited by examiner

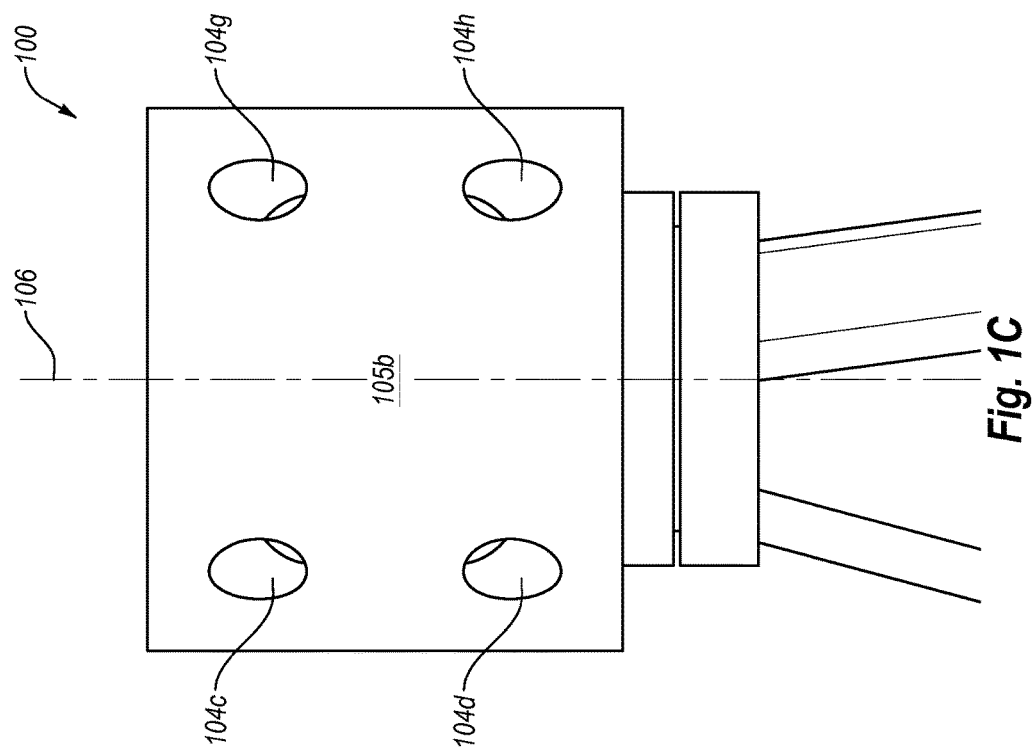
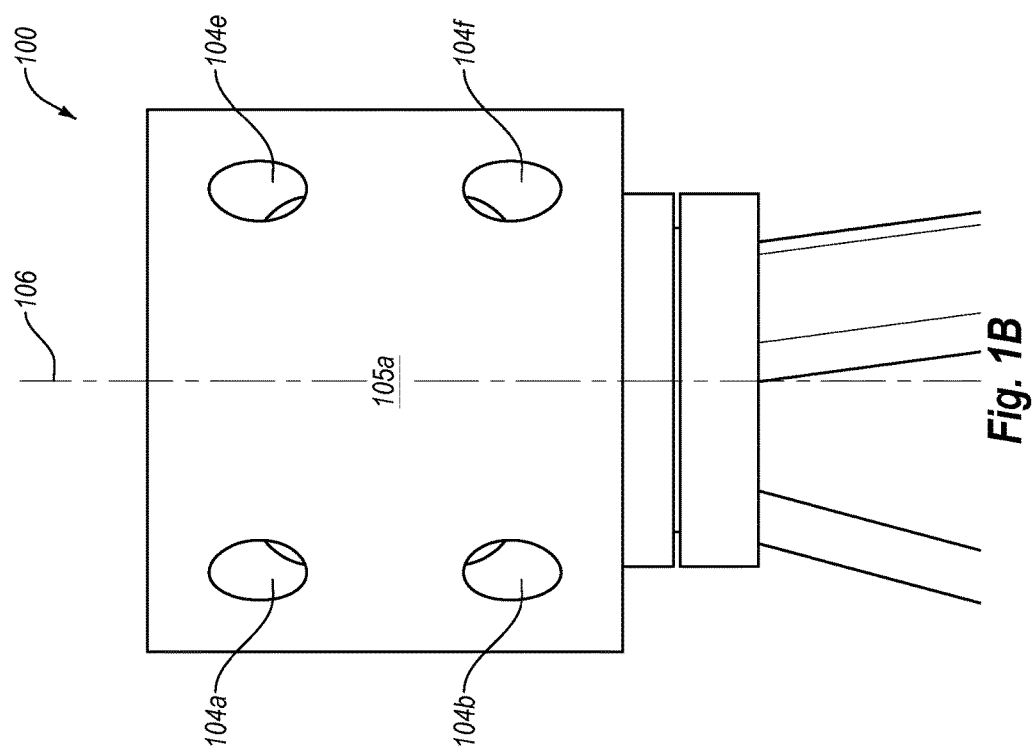

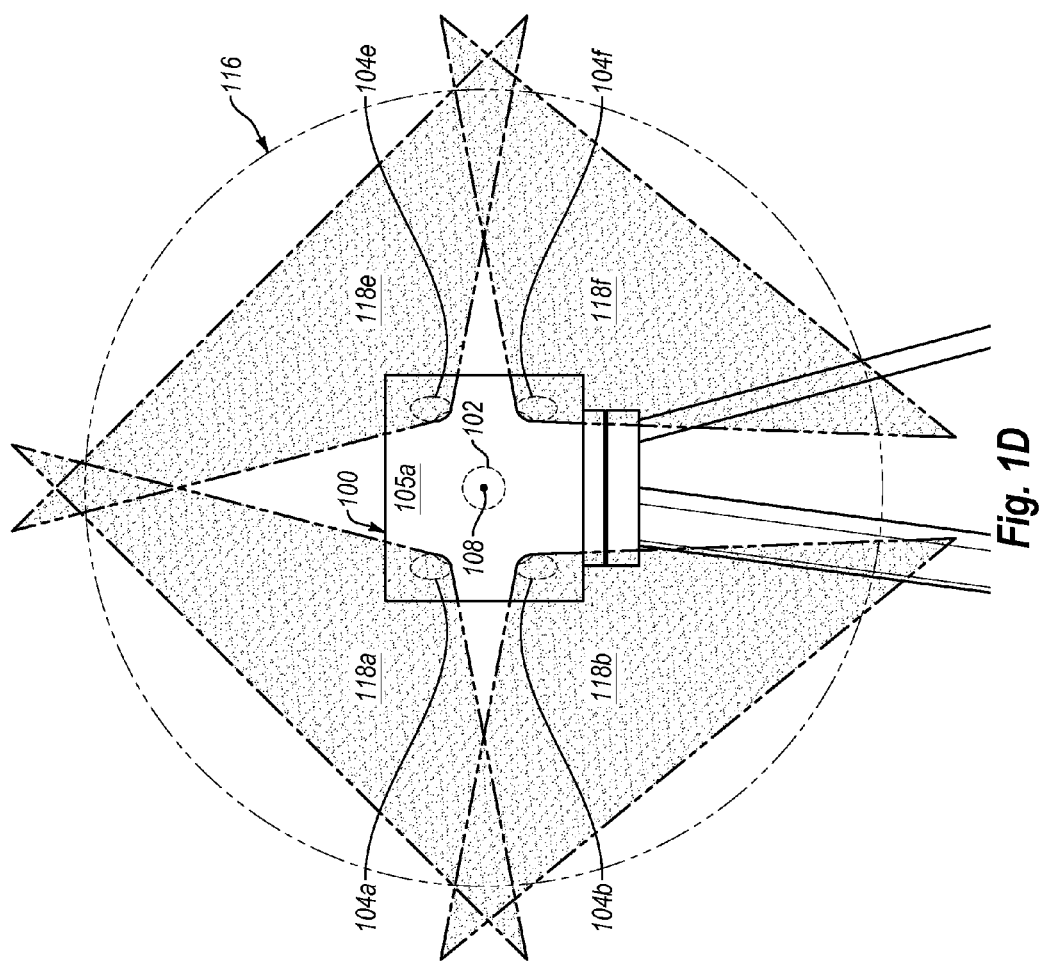

US 9,903,950 B2

MULTI-CAMERA LASER SCANNER

FIELD

The embodiments discussed herein are related to multi-camera laser scanners.

BACKGROUND

Laser scanning is used to survey many different settings such as construction sites, historical buildings, industrial facilities or any other applicable setting. The laser scanning may be used to obtain accurate three-dimensional (3D) models of the settings. Additionally, a camera may be associated with a laser scanner and may be configured to capture images associated with the setting being scanned.

SUMMARY

According to at least one embodiment, a device may include a laser configured to rotate about an azimuth axis of the device and an elevation axis of the device. The device may also include a plurality of cameras configured to rotate about the azimuth axis and fixed with respect to the elevation axis. The cameras may be configured to have a collective field-of-view that includes a collective elevation field-of-view and a collective azimuth field-of-view. The collective elevation field-of-view may include at least twenty-five percent of a 360° elevation view about the elevation axis and the collective azimuth field-of-view may include at least fifteen percent of a 360° azimuth view about the azimuth axis. The device may also include a control system configured to direct the laser to rotate about the azimuth axis and the elevation axis such that the laser is configured to scan a setting. The control system may also be configured to direct the cameras to each begin capturing an image of the setting at substantially the same time.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1B illustrates a front view of a first portion of the laser scanner of FIG. 1A;

FIG. 1C illustrates a front view of a second portion of the laser scanner of FIG. 1A;

FIG. 1D illustrates a cross-sectional view that depicts example elevation fields-of-view of cameras of the laser scanner of FIG. 1A.

DESCRIPTION OF EMBODIMENTS

A laser scanner may include a laser configured to scan a setting and collect thousands, millions or even billions of points of three-dimensional position information associated with the setting. The points and associated information may be saved as scan point data, which may be collected as a "scan point cloud." In some embodiments, the points may be collected so densely that the associated scan point data may be used to effectively re-create a scene of the setting scanned by the laser scanner.

Additionally, the laser scanner may include multiple cameras that may be configured to capture one or more images of the setting that is being scanned by the laser scanner. As disclosed in detail below, in some embodiments, the laser scanner may be configured such that the plurality of cameras may each begin capturing an image at substantially the same time. Additionally, the cameras may be configured to have a collective field-of-view that includes a collective elevation field-of-view and a collective azimuth field-of-view. The collective elevation field-of-view may include at least 25% of a 360° elevation view about an elevation axis of the laser scanner. The collective azimuth field-of-view may include at least 15% of a 360° azimuth view about an azimuth axis of the laser scanner. The collective fields-of-view and the elevation and azimuth axes are described in further detail below.

As described below, having the cameras configured in the manner indicated above may allow for more efficient image capture associated with a scan of the setting. Additionally, data that may be derived from the images captured by the cameras because of the specified configuration of the cameras may allow for improved analysis and correction of the scan data that may be captured by the laser.

Embodiments of the present disclosure are now explained with reference to the accompanying drawings.

Figure 1A:
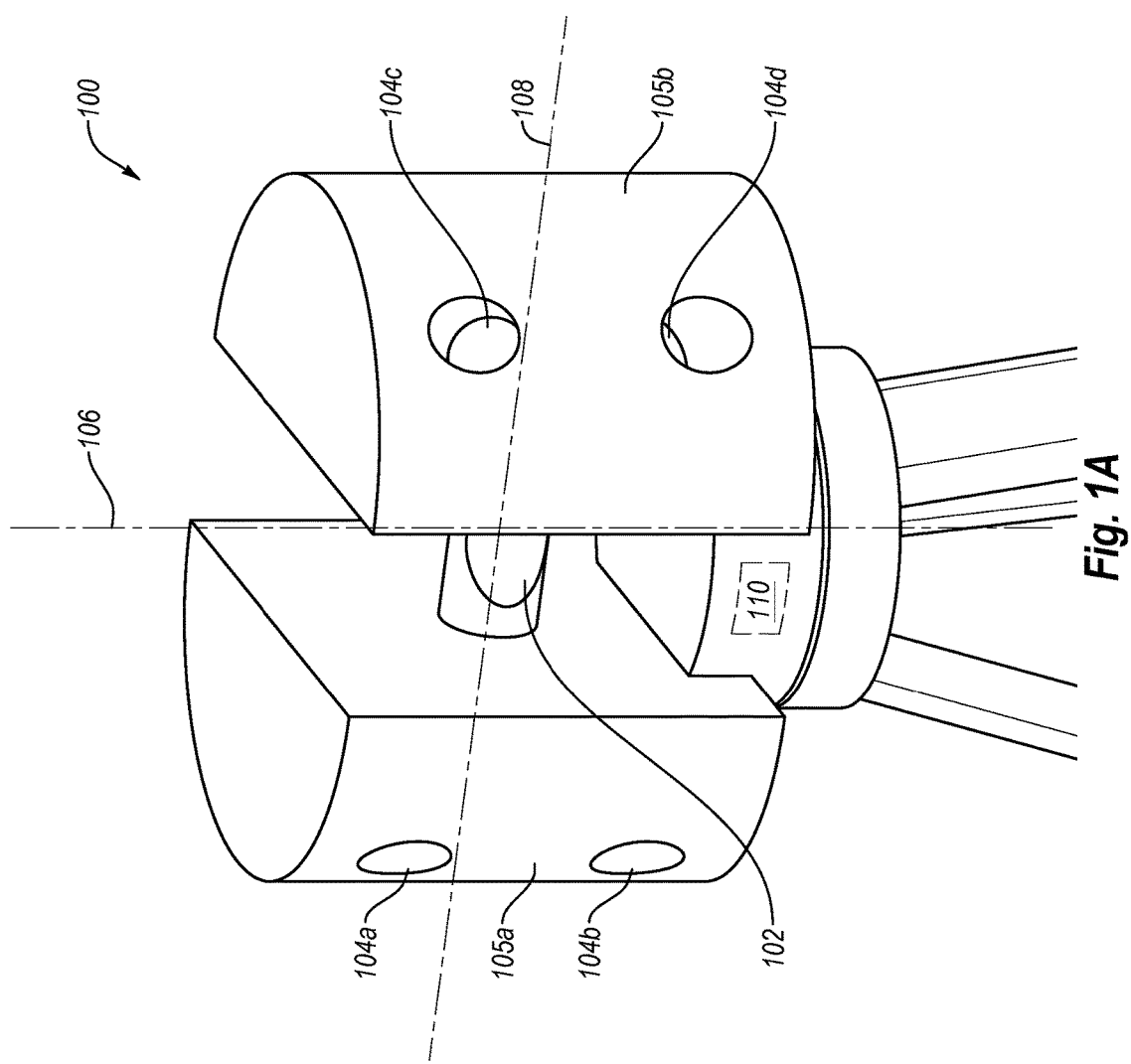
FIG. 1A illustrates a perspective view of an example laser scanner.

FIG. 1A illustrates a perspective view of an example laser scanner 100, configured according to at least one embodiment described herein. The laser scanner 100 may include a laser 102, multiple cameras 104, and an associated control system 110. The laser 102 may include any suitable laser that may be configured to perform a scan of a setting. For example, in some embodiments, the laser 102 may include a LIght Detection And Ranging (LIDAR) laser.

The laser 102 may be configured to rotate about an azimuth axis 106 and an elevation axis 108 of the laser scanner 100. In some embodiments, when scanning a setting, the laser 102 may be configured to rotate about the elevation axis 108 and the azimuth axis 106 such that the laser 102 may scan an area surrounding the laser scanner 100. In these or other embodiments, the laser 102 may be configured to quickly rotate about the elevation axis 108 as the laser is slowly rotating about the azimuth axis 106. In some embodiments, the laser 102 may rotate about the elevation axis at a frequency that may be more than a thousand times faster than its rotation about the azimuth axis.

In particular, the laser 102 may have a range of motion about the elevation axis 108 of at least 180° and may be configured to sweep back and forth about its range of motion associated with the elevation axis 108. The laser 102 may also have a range of motion about the azimuth axis 106 of at least 180°. In some embodiments, while the laser 102 is sweeping about the elevation axis 108, the laser 102 may be configured to rotate about the azimuth axis 106. Therefore, from the rotation of the laser 102 about the azimuth axis 106 and about the elevation axis 108, the laser 102 may obtain scan point data of a setting surrounding the laser 102 and the laser scanner 100.

The cameras 104 may be disposed on a first portion 105a and a second portion 105b of the laser scanner 100. FIG. 1B illustrates a front view of the first portion 105a and FIG. 1C illustrates a front view of the second portion 105b. As illustrated in FIGS. 1A-1C, the first portion 105a may include cameras 104a, 104b, 104e, and 104f and the second portion 105b may include cameras 104c, 104d, 104g, and 104h. The first portion 105a and the second portion 105b may be configured to rotate about the azimuth axis 106 such that the cameras 104 may also rotate about the azimuth axis 106. However, the first portion 105a and the second portion 105b may be fixed with respect to the elevation axis 108 such that the cameras 104 may not rotate about the elevation axis 108.

The cameras 104 may include any camera known in the art that captures photographs and/or records digital video of any aspect ratio, size, and/or frame rate. The cameras 104 may include an image sensor that samples and records a field-of-view. The image sensor, for example, may include a charge-coupled device (CCD) or a complementary metal-oxide semiconductor (CMOS) sensor. The cameras 104 may provide raw or compressed image data, which may be stored by the control system 110 as image files. The image data provided by the camera 104 may include still image data (e.g., photographs) and/or a series of frames linked together in time as video data. In the present disclosure use of the term "image" may refer to image data, image files, and/or the actual representation of a setting that may be captured in the image (e.g., the image itself).

The cameras 104 may each have a field-of-view that includes an azimuth field-of-view and an elevation field-of-view. The aggregate of the individual fields-of-view of the cameras may be referred to as the collective field-of-view of the cameras 104. The collective field-of-view may include a collective azimuth field-of-view and a collective elevation field-of-view. In some embodiments, the cameras 104 may be configured such that the collective azimuth field-of-view of the cameras 104 may substantially include at least 15% of a 360° azimuth view about the azimuth axis 106. In these or other embodiments, the cameras 104 may be configured such that collective elevation field-of-view of the cameras 104 may substantially include at least 25% of a 360° elevation view about the elevation axis 108. Configuration of the cameras 104 may include lens selection of the cameras 104 and/or placement of the cameras 104 on the laser scanner 100.

FIG. 1D illustrates a cross-sectional view of an example of elevation fields-of-view 118a, 118b, 118e, and 118f of the cameras 104a, 104b, 104e, and 104f, respectively, according to at least one embodiment described herein. FIG. 1D also illustrates a 360° elevation view 116 about the elevation axis 108. The elevation fields-of-view 118 may be a function of the direction that the associated cameras 104 are pointed and the types of lenses that may be used for the associated cameras 104. Accordingly, the lens types and pointing directions of the cameras 104 may be selected such that a desired collective elevation field-of-view of the cameras 104 may be obtained. In the example embodiment of FIG. 1D, the cameras 104a, 104b, 104e, and 104f may be configured (e.g., based on lens selection, location, and/or pointing direction) such that collective elevation field-of-view of the cameras 104a, 104b, 104e, and 104f substantially includes over 75% of the 360° elevation view 116, as illustrated.

FIG. 1D is merely an example configuration of elevation fields-of-view of multiple cameras. Any number of other configurations may be obtained. Further, in the example laser scanner 100, the cameras 104c, 104d, 104g, and 104h may be configured to have elevation fields-of-view (which are not expressly depicted) substantially similar to the elevation fields-of-view 118a, 118b, 118e, and 118f, respectively.

Figure 1E:
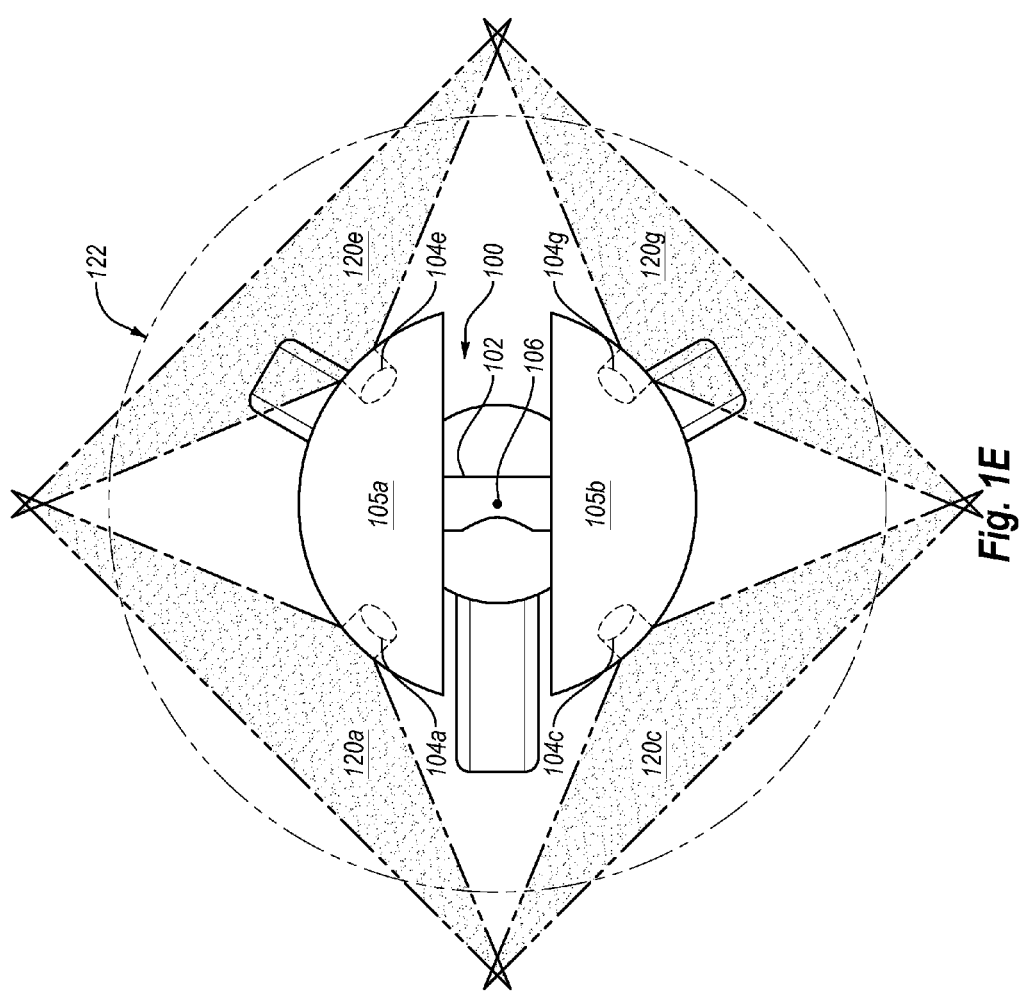
FIG. 1E illustrates a top view that depicts example azimuth fields-of-view of cameras of the laser scanner of FIG. 1A.

FIG. 1E illustrates a top view of the laser scanner 100 that depicts example azimuth fields-of-view 120a, 120c, 120e, and 120g of the cameras 104a, 104c, 104e, and 104g, respectively, according to at least one embodiment described herein. FIG. 1E also illustrates a 360° azimuth view 122 about the azimuth axis 106. The azimuth fields-of-view 120 may be a function of the direction that the associated cameras 104 are pointed and the types of lenses that may be used for the associated cameras 104. Accordingly, the lens types and pointing directions of the cameras 104 may be selected such that a desired collective azimuth field-of-view of the cameras 104 may be obtained. In the example embodiment of FIG. 1E, the cameras 104a, 104c, 104e, and 104g may be configured (e.g., based on lens selection, location, and/or pointing direction) such that the collective azimuth field-of-view of the cameras 104a, 104c, 104e, and 104g substantially includes approximately 50% of the 360° azimuth view 122, as illustrated.

FIG. 1E is merely an example configuration of azimuth fields-of-view of multiple cameras with respect to an overall field-of-view of a laser. Any number of other configurations may be obtained. For example, in some embodiments, the cameras 104a, 104c, 104e, and 104g may be configured such that their azimuth fields-of-view may overlap with at least those of the cameras of which they are adjacent. Therefore, their collective azimuth field-of-view (as created by the aggregate of the azimuth fields-of-view 120a, 120c, 102e, and 120g) substantially includes the entire 360° azimuth view 122.

Additionally, in the example laser scanner 100, the cameras 104b, 104d, 104f, and 104h may be configured to have azimuth fields-of-view substantially similar to the azimuth fields-of-view 120a, 120c, 120e, and 120g, respectively. Further, as illustrated in FIGS. 1B and 1C, the camera 104a may be placed substantially directly above the camera 104b, the camera 104e may be placed substantially directly above the camera 104f, the camera 104c may be placed substantially above the camera 104d, and the camera 104g may be placed substantially directly above the camera 104h. Therefore, the azimuth field-of-view 120a of the camera 104a may be in substantially the same azimuth location as the azimuth field-of-view of the camera 104b, the azimuth field-of-view 120e of the camera 104e may be in substantially the same azimuth location as the azimuth field-of-view of the camera 104f, the azimuth field-of-view 120c of the camera 104c may be in substantially the same azimuth location as the azimuth field-of-view of the camera 104d, and the azimuth field-of-view 120g of the camera 104g may be in substantially the same azimuth location as the azimuth field-of-view of the camera 104h.

In alternative embodiments, the camera 104a may not be placed substantially directly above the camera 104b, the camera 104e may not be placed substantially directly above the camera 104f, the camera 104c may not be placed substantially above the camera 104d, and the camera 104g may not be placed substantially directly above the camera 104h. Therefore, the azimuth field-of-view 120a of the camera 104a may not be in substantially the same azimuth location as the azimuth field-of-view of the camera 104b, the azimuth field-of-view 120e of the camera 104e may not be in substantially the same azimuth location as the azimuth field-of-view of the camera 104f, the azimuth field-of-view 120c of the camera 104c may not be in substantially the same azimuth location as the azimuth field-of-view of the camera 104d, and the azimuth field-of-view 120g of the camera 104g may not be in substantially the same azimuth location as the azimuth field-of-view of the camera 104h. Further, in some embodiments, the azimuth fields-of-view of the cameras 104b, 104d, 104f, and 104h may be different from the azimuth fields-of-view 120a, 120c, 120e, and 120g, respectively.

In some embodiments, the cameras 104a-104h may be configured such that their collective azimuth field-of-view substantially includes at least 75% of the 360° azimuth view 122 (illustrated in FIG. 1E) and at least 35% of the 360° elevation view 116 (illustrated in FIG. 1D). In these embodiments, the collective field-of-view of the cameras 104a-104h may be considered "omnidirectional."

Figure 1F:
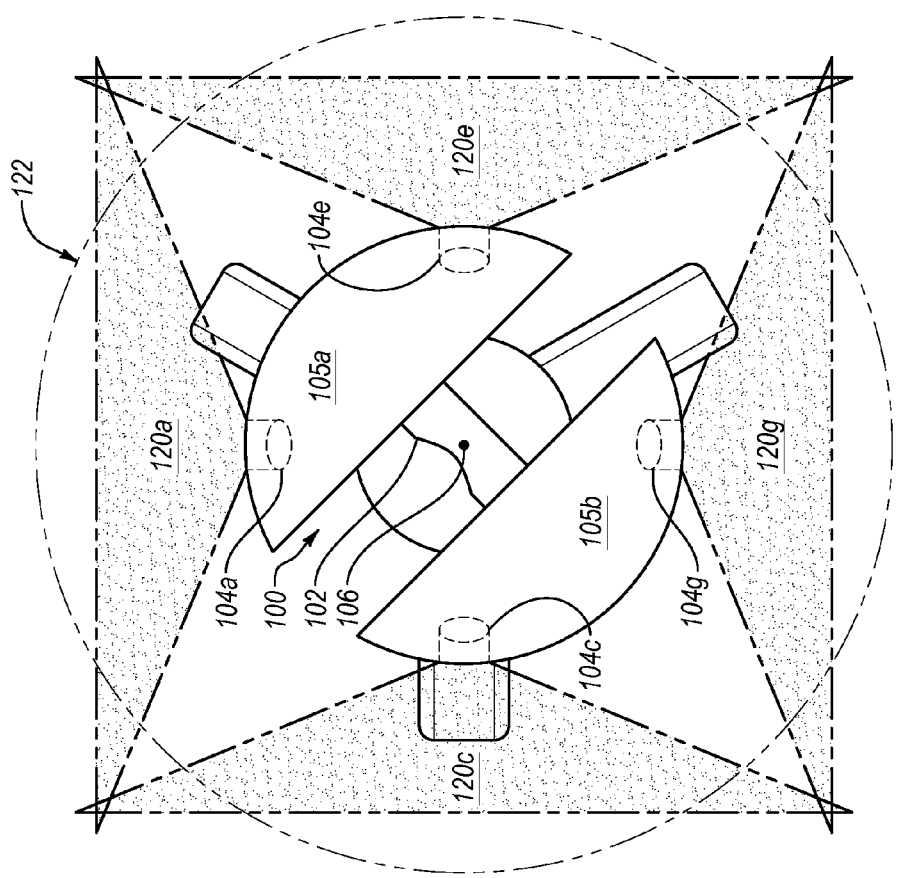
FIG. 1F illustrates the azimuth fields-of-view depicted in FIG. 1E with respect to a 45° clockwise rotation as compared to the illustrated depiction in FIG. 1E.

As mentioned above, the first portion 105a and the second portion 105b may be configured to rotate about the azimuth axis 106 such that the azimuth fields-of-view of the cameras 104 may also rotate about the azimuth axis 106. For example, FIG. 1F illustrates the azimuth fields-of-view 120 depicted in FIG. 1E with respect to a 45° clockwise rotation about the azimuth axis 106 as compared to the illustrated depiction in FIG. 1E.

In some embodiments, one or more of the cameras 104 may be approximately equally spaced from each other in a plane associated with rotation about the azimuth axis 106. For example, in the illustrated embodiments of FIGS. 1E and 1F, the cameras 104a, 104c, 104e, and 104g may be spaced approximately 90° apart along a circle of rotation associated with rotation about the azimuth axis 106. Additionally, although not explicitly illustrated in FIGS. 1E and 1F, the cameras 104b, 104d, 104f, and 104h may also be spaced approximately 90° apart along a circle of rotation associated with rotation about the azimuth axis 106.

Returning to FIG. 1A, the control system 110 may be configured to direct one or more operations of the laser scanner 100. Additionally, in some embodiments, the control system may be configured to process data gathered by the laser scanner 100. In these or other embodiments, one or more elements of the control system 110 may be integrated with the laser scanner 100 and/or external and communicatively coupled to the laser scanner 100. A computing device 500 of FIG. 5 described below is an example implementation of the control system 110.

In some embodiments, the control system 110 may be configured to direct the laser 102 to perform scans of a setting. The control system 110 may also be configured to direct the rotation of the laser 102 about the azimuth axis 106 and the elevation axis 108 associated with scanning the setting. Further, the control system 110 may be configured to collect, store, and/or process scan data associated with the laser 102 scanning the setting.

The control system 110 may also be configured to direct one or more operations of the cameras 104. For example, the control system 110 may be configured to direct each of the cameras 104 to begin capturing an image of the setting at substantially the same time. In some embodiments, each image captured by each of the cameras 104 at substantially the same time may then be combined to generate a "full-dome image" of the setting that may depict the setting from the perspective of the collective field-of-view of the cameras 104.

In these or other embodiments, the control system 110 may be configured to direct one or more of the cameras 104 to each take one or more images of the setting in conjunction with the laser 102 scanning the setting. For example, the control system 110 may direct the cameras 104 to each capture an image at different azimuth rotational positions as the laser 102 and the cameras 104 are rotated about the azimuth axis 106 during the scan of the setting.

In some embodiments, the control system 110 may be configured to direct the cameras 104 to capture images at azimuth rotational positions where a first center of projection of a first camera at a first azimuth rotational position may be substantially the same as a second center of projection of a second camera at a second azimuth rotational position. Therefore, when the fields-of-view of the first camera and the second camera are substantially similar, a first image taken at the first azimuth rotational position by the first camera may depict substantially the same portion of the setting as a second image captured by the second camera at the second azimuth rotational position.

For example, the camera 104a and the camera 104e may be spaced 90° apart from each other as depicted in FIGS. 1E and 1F, and may have substantially the same and/or overlapping fields-of-view. Additionally, the control system 110 may be configured to direct the camera 104e to capture a first image when the laser scanner 100 is at a first azimuth rotational position. After a rotation about the azimuth axis of approximately 90° in the direction from the camera 104a to the camera 104e (e.g., the clockwise direction as indicated in FIGS. 1E and 1F), the laser scanner 100 may be at a second azimuth rotational position. The center of projection of the camera 104a at the second azimuth rotational position may be substantially the same as the center of projection of the camera 104e at the first azimuth rotational position. Accordingly, the control system 110 may be configured to direct the camera 104a to capture a second image when the laser scanner is at the second azimuth rotational position such that the portion of the setting that may be captured in the first image by the camera 104e may also be substantially captured in the second image by the camera 104a at a later time. As detailed below, image data of images depicting substantially the same portion of the setting that are taken at different times during a scan by the laser 102 may be used to help identify and/or process anomalies or errors in scan point data.

In these or other embodiments, the control system 110 may also be configured to direct the cameras 104 to capture images at azimuth rotational positions where a first center of projection of one or more of the cameras 104 at a first azimuth rotational position may be different from a second center of projection of the one or more cameras 104 at a second azimuth rotational position. For example, the control system 110 may be configured to direct the cameras 104 to capture images when the cameras 104 are at a first azimuth rotational position as depicted in FIG. 1E and the control system 110 may be configured to direct the cameras 104 to capture images when the cameras 104 are at a second azimuth rotational position as depicted in FIG. 1F.

Further, first image data associated with images taken by the one or more cameras 104 at the first azimuth position may be compared with second image data associated with images taken by the one or more cameras 104 at the second azimuth rotational position to generate a photogrammetric depth map of the setting. In these embodiments, the amount of rotation from the first azimuth rotational position to the second azimuth rotational position and the azimuth fields-of-view of the one or more cameras 104 may be such that a substantial amount of overlap between the first image data and the second image data may allow for the generation of the photogrammetric depth map.

Additionally, or alternatively, the azimuth fields-of-view of the cameras 104 may overlap such that a photogrammetric depth map may be generated based on the first image data or the second image data alone. For example, the azimuth fields-of-view of the cameras 104a and 104e may substantially overlap such that a photogrammetric depth map may be generated from one or more features of a setting in images captured by the cameras 104a and 104e at substantially the same time. As detailed below, the photogrammetric depth map may be used to help identify and/or process anomalies or errors in scan point data.

Moreover, in some embodiments, the control system 110 may be configured to direct the cameras 104 to capture video during a scan of the setting. In some embodiments, the video may be used to identify objects that may be moving during the scanning process. Additionally, in these or other embodiments, the video may be used to identify whether or not the laser scanner 100 is moved (e.g., bumped or jostled) during the scan of the setting. As detailed below, identification of moving objects and/or movement of the laser scanner 100 during a scan may also help identify anomalies in the associated scan data and/or determine whether or not the integrity of the associated scan data has been compromised.

In some embodiments, the control system 110 may also be configured to direct the cameras 104 to capture images when the laser scanner 100 is being moved from a first location to a second location. In some embodiments, the cameras 104 may be configured to capture the images as a video that includes a series of images. The images captured during movement of the laser scanner 100 from the first location may be used in conjunction with scan point data associated with a scan of the setting at the location to track and estimate the position and/or orientation of the laser scanner 100 at the second location with respect to the first location. Additionally, in some embodiments, the images captured during the movement of the laser scanner may also be used to generate a depth map using any suitable technique. Further detail with respect to estimating the position and/or orientation of the second location with respect to the first location is given below with respect to method 400 of FIG. 4.

In some embodiments, the control system 110 may be configured to indicate to a user of the laser scanner 100 a degree of certainty of the estimated position and/or orientation of the second location with respect to the first location. The degree of certainty may indicate information regarding overlap of a second scan (potential or already taken) that may be taken at the second location with respect to a first scan taken at the first location. Additionally, the degree of certainty may indicate an ability to perform a registration of the first scan with respect to the second scan. A "registration" between scans may refer to determining the relative position of a location of the setting in one of the scans with respect to the position of the same location of the setting in another scan.

In these or other embodiments, the estimated position and/or orientation of the second location with respect to the first location may be used to determine an overlap between a first scan taken at a first location and a second scan (potential or already taken) that may be taken at the second location. Additionally, it may be determined whether the overlap between the first scan and the second scan is sufficient to obtain a desired amount of information about the setting. For example, it may be determined whether the overlap between the first scan and the second scan is sufficient to allow for a registration of the first scan and the second scan. Additionally, it may be determined whether or not the overlap is small enough such that the second scan may cover a desired amount of the setting that may not be covered by the first scan.

In some embodiments, the amount of desired overlap may be based on an overlap threshold. The overlap threshold may be based on having enough overlap to perform a registration between the first and second scans but also a small enough amount of overlap to satisfy a desired amount of coverage of the setting between the first and second scans. In these or other embodiments, whether or not the second scan satisfies the overlap threshold may be indicated to a user of the laser scanner 100.

Moreover, as detailed below, when a second scan is taken at the second location, a registration between the first scan and the second scan may be estimated based on the estimated position and/or orientation of the second location with respect to the first location. In some embodiments, the control system 110 and/or another computing system may be configured to perform one or more of the operations associated with estimating the position, orientation, registration, and/or overlap.

Accordingly, the laser scanner 100 may be configured to generate images of a setting in a manner that the images may complement and be used with scan point data such that a more accurate representation of the setting may be generated. Modifications, additions, or omissions may be made to the laser scanner 100 without departing from the scope of the present disclosure. For example, the number, orientation, and/or location of the cameras 104 may differ from the embodiment illustrated herein. Further, the control system 110 may have more or less functionality than that described herein. Additionally, the laser scanner 100 may include other components not explicitly described herein. For example, the laser scanner 100 may include an accelerometer, a compass, and/or a Global Positioning System (GPS) sensor.

Figure 2A:
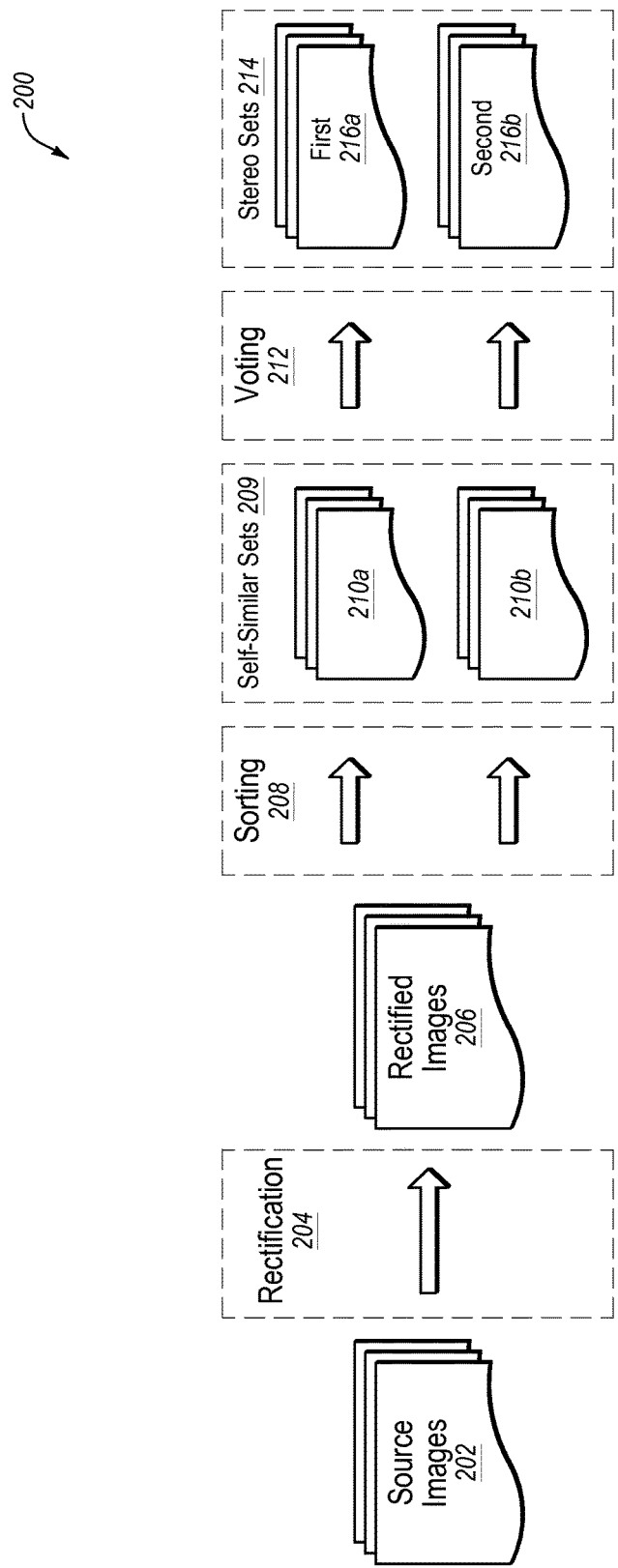
FIG. 2A illustrates a control flow corresponding to image processing that may be performed with respect to source images that may be captured by multiple cameras of a laser scanner.

FIG. 2A illustrates a control flow 200 corresponding to image processing that may be performed with respect to source images 202 that may be captured by multiple cameras of a laser scanner, according to at least one embodiment described herein. For example, in some embodiments, the control flow 200 may be performed with respect to images that may be captured by the cameras 104 of the laser scanner 100 described above with respect to FIGS. 1A-1F. The control flow 200 may be implemented by any suitable general-purpose or special-purpose computing device. For example, one or more elements of the control flow 200 may be implemented by the control system 110 of the laser scanner 100 or by the computing device 500 described below with respect to FIG. 5 in an implementation that is separate from the laser scanner 100.

As indicated above, the control flow 200 may be performed with respect to source images 202. The source images 202 may include multiple images that may be taken by the multiple cameras of the laser scanner. The source images 202 may include images taken by the multiple cameras at multiple azimuth rotational positions in conjunction with a scan of a setting by a laser of the laser scanner.

In some embodiments, the source images 202 may be High Dynamic Range (HDR) images that may be generated from multiple images captured by each of one or more of the cameras at a particular azimuth rotational position. For example, a particular camera may capture multiple images at different exposure levels while at a particular azimuth rotational position. The multiple images taken at different exposure levels may be used to generate an HDR image associated with the particular camera and particular azimuth rotational position. The HDR image may then be used as a source image 202.

An image rectification 204 may be performed on the source images 202 to generate rectified images 206. Although different cameras may be configured to have substantially the same field-of-view and such, lens distortions between the different cameras may create differences in images taken by the different cameras. The image rectification 204 may help compensate for lens distortions between the different cameras such that the rectified images 206 may be configured as being taken from substantially the same camera instead of from different cameras. In some embodiments, the lens distortions between the cameras may be determined during a calibration process in which each of the cameras may capture an image at substantially the same center of projection.

The rectified images 206 may then be sorted via a sorting process 208. During the sorting process 208, images of the rectified images may be sorted into self-similar sets 209. Self-similar sets may be sets of images that may be taken at different times that may include substantially the same portion of an associated setting included therein. For example, a first camera and a second camera may have substantially the same fields-of-view and may be in substantially the same elevation plane. Additionally, the first and second cameras may be spaced 90° apart with respect to a circumference surrounding an azimuth axis of the laser scanner. The cameras 104e and 104a of the laser scanner 100 of FIGS. 1A-1F are example cameras that may be the first and second cameras of this example. Additionally, the first camera may capture a first image at a first time and a first azimuth rotational position of the laser scanner. After which, the first and second cameras may be rotated to a second azimuth rotational position with an approximately 90° rotation about the azimuth axis of the laser scanner in the direction from the second camera to the first camera. The second camera may then capture a second image at the second azimuth rotational position, which may capture substantially the same portion of the setting as the first image. Therefore, the first and second images may be considered a self-similar set of images.

The self-similar sets 209 may also be sorted into stereographic pairs where one of the self-similar sets 209 of the stereographic pair may be a first self-similar set 210a of the stereographic pair and the other self-similar sets 209 of the stereographic pair may be a second self-similar set 210b of the stereographic pair. Accordingly, a first self-similar set 210a and a second self-similar set 210b may be determined for each stereographic pair.

The stereographic pairs may be determined based on self-similar sets 209 that are offset from each other, but that capture at least part of the same portion of the setting. For example, as described above, the first and second images taken by the first and second cameras described above before and after a 90° rotation about the azimuth axis may be a first self-similar set 210a. Additionally, a third image may be taken by the first camera after a 45° rotation about the azimuth axis from the first azimuth rotational position. Further, a fourth image may be taken by the second camera after a 135° rotation about the azimuth axis from the first azimuth rotational position. The third and fourth images may be a self-similar set and may capture at least part of the same portion of the setting as the first and second images such that the first and second images and the third and fourth images may make a stereographic pair. As such, the third and fourth images may be a second self-similar set 210b that corresponds to the first self-similar set 210a that includes the first and second images.

Each of the first and second self-similar sets 210 may then go through a voting process 212, in which objects moving within the setting during the capturing of the images may be removed from the images. As mentioned above, the images included in a particular first or second self-similar set 210 may capture substantially the same portion of the setting at different times. Therefore, objects that are moving (e.g., people, cars, animals, etc.) may be at different locations within different images of the particular first or second self-similar set 210. The moving objects may be removed from the images as part of the voting process 212, which may "vote" as to which objects may be removed. In some embodiments, the objects may be identified using any suitable technique or process that may compare the images within the particular first or second self-similar set 210 to determine which objects were moving when the images were captured The images in each first or second self-similar set 210 may be reduced to a single image after the voting process such that a stereo set 214 for each stereographic pair of image sets may be generated with the moving objects removed. The stereo sets 214 may accordingly each include a first image 216a and a corresponding second image 216b Therefore, the control flow 200 may be used to perform one or more image processing steps with respect to images that may be captured by multiple cameras of a laser scanner. Modifications may be made to the control flow 200 without departing from the scope of the present disclosure. For example, in some embodiments, the voting process 212 may be used to identify and flag objects that may be moving in the images, but may not actually remove the objects from the corresponding first and second images 216

Figure 2B:
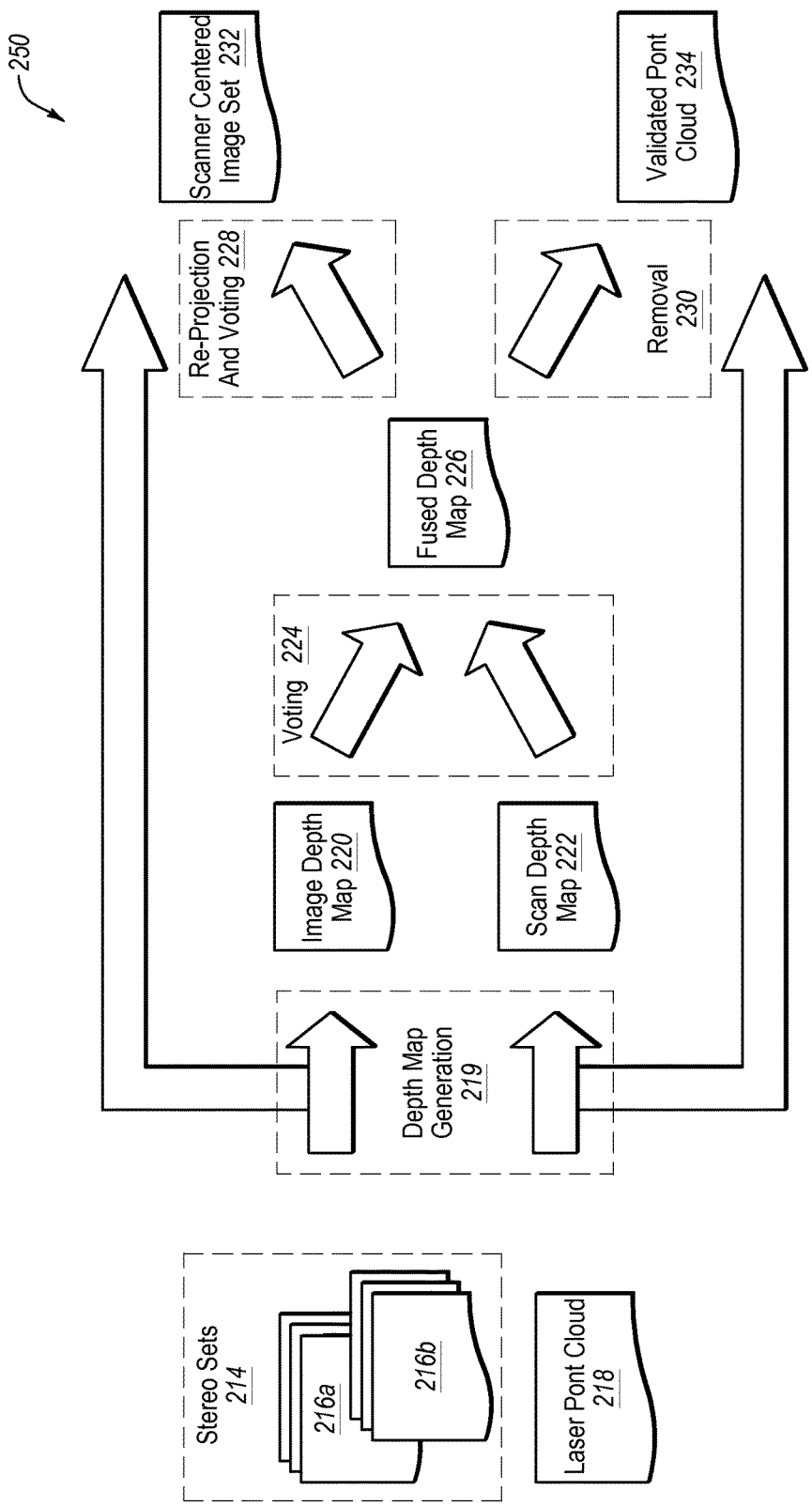
FIG. 2B illustrates a control flow that may be performed with respect to a laser point cloud and a stereo set that may be obtained from the control flow of FIG. 2B.

FIG. 2B illustrates a control flow 250 that may be performed with respect to a laser point cloud 218 and the stereo set 214 that may be obtained from the control flow 200, according to at least one embodiment described herein. The control flow 250 may be implemented by any suitable general-purpose or special-purpose computing device. For example, one or more elements of the control flow 250 may be implemented by the control system 110 of the laser scanner 100 or by the computing device 500 described below with respect to FIG. 5 in an implementation that is separate from the laser scanner 100.

The control flow 250 may include a depth map generation process 219 in which an image depth map 220 may be generated from the stereo sets 214 and in which a scan depth map 222 may be generated from the laser point cloud. The generation of the image depth map 220 may be obtained using any suitable stereo photogrammetry algorithm or technique that may determine a photogrammetric depth from stereo images. The generation of the scan depth map 222 may be performed according to any suitable algorithm or technique.

The image depth map 220 may be less precise than the scan depth map 222 such that the image depth map 220 may have a higher degree of depth uncertainty than the scan depth map 222 (e.g., up to ten times greater uncertainty). However, the scan depth map 222 may be generated from a laser scan that may scan an area of the setting just once, which means that moving objects may create anomalies in the scan depth map 222 that may not be noticed. In contrast, the image depth map 220 may be generated based on the first image 216a and the second image 216b in which moving objects may have been previously removed. Therefore, anomalies in the image depth map 220 due to moving objects may be greatly reduced.

As such, a voting process 224 may be used to determine potential anomalies in the scan depth map 222 based on the image depth map 220. For example, a comparison of depth of the areas of the setting in the scan depth map 222 may be made with respect to the depth of the same areas in the image depth map 220. When the indicated depth of a particular area in the scan depth map 222 is off from the indicated depth of the particular area in the image depth map 220 by a factor that is greater than the depth uncertainty of the image depth map 220, it may be determined that a potential anomaly may be present or that an anomaly is present in the scan depth map 222 (e.g., due to a moving object). Accordingly, the scan point data associated with the anomalous depth may be flagged and/or removed as being anomalous and unreliable. In some embodiments, the voting process 224 may use a filter based on the image depth map 220 to determine which depth data of the scan depth map 222 may be anomalous.

Following, and based on, the voting process 224, a fused depth map 226 may be generated. The fused depth map 226 may include the more precise depth that may be determined from the scan depth map 222 while also using the depth indicated in the image depth map 220 for anomalous depth indications of the scan depth map 222 that may be caused by moving objects. Therefore, the fused depth map 226 may exploit the strengths of the image depth map 220 and the scan depth map 222 while reducing some of their respective weaknesses.

The fused depth map 226 may be used in a removal process 230 in which the scan point data associated with the anomalous depths may be removed from the laser point cloud 218 to generate a validated point cloud 234. Therefore, the validated point cloud 234 may be more accurate than the laser point cloud 218.

Additionally, the fused depth map 226 may be used in a re-projection and voting process 228. During the re-projection and voting process 228, the images included in the stereo sets 214 may be re-projected into a final image or image set 232 with a center of projection being substantially the same as the center of projection of the actual laser instead of that of the cameras. The depth and perspective included in the fused depth map 226 may provide depth and perspective with respect to the images in the stereo sets 214 to allow this process to take place. The generation of the image set 232 may be performed using any suitable process.

In some embodiments, during the re-projection and voting process 228, determination of which image or images from the stereo sets 214 to use for particular pixels of the image set 232 may be performed using a voting process. For example, multiple images may potentially capture a particular point in the setting that may be represented by the image set 232. However, the particular point may be blocked or obscured in one or more of the multiple images. Therefore, the voting process may be used to determine which images may include the obscuration of the particular point, which may indicate that a visibility of the particular point by one or more of the cameras was blocked. For example, a pixel of an image with an obscuration of a particular point in the setting may have a completely different color or element than a corresponding pixel of another image of the particular point that does not have an obscuration. In some embodiments, based on the voting process, the colors of images without the obscuration may be used to provide color to the image set 232 and/or the validated point cloud 234.

Accordingly, the control flow 250 may be used to improve laser point cloud data and/or images associated with a scan of a setting by analyzing and comparing images captured by multiple cameras during the scan with the laser point cloud data. Modifications, additions, or omissions may be made to the control flow 250 without departing from the scope of the present disclosure. For example, more or fewer steps may be included with one or more of the processes described with respect to the control flow 250.

Figure 3:
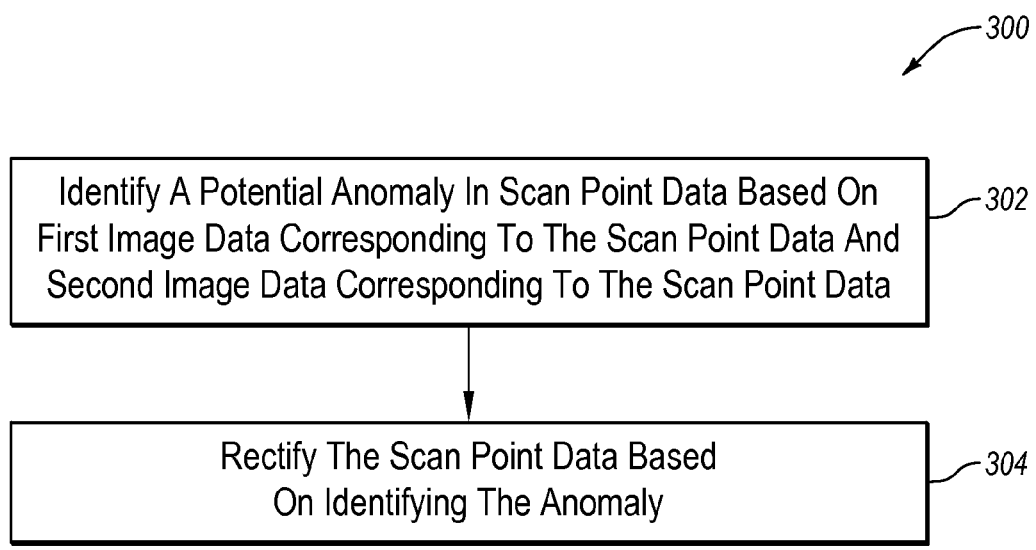
FIG. 3 is flowchart of an example method of processing scan point data obtained by a laser of a laser scanner.

FIG. 3 is flowchart of an example method 300 of processing scan point data obtained by a laser of a laser scanner, arranged in accordance with at least one embodiment described herein. The method 300 may be implemented by any suitable general-purpose or special-purpose computing device. For example, one or more elements of the method 300 may be implemented by the control system 110 of the laser scanner 100 or by the computing device 500 described below with respect to FIG. 5 in an implementation that is separate from the laser scanner 100. Although illustrated as including discrete blocks, various blocks of the method 300 may be divided into additional blocks, combined into fewer blocks, or eliminated, depending on the desired implementation.

The method 300 may begin at block 302, where a potential anomaly in scan point data associated with a scan of a setting may be identified. The potential anomaly may be identified based on first image data corresponding to the scan point data and second image data corresponding to the scan point data. The scan may be performed by a laser of a laser scanner, the first image data may be captured by multiple cameras of the laser scanner at a first time during the scan and the second image data may be captured by the plurality of cameras at a second time during the scan. In some embodiments, the potential anomaly may be identified based on the first and second image data using one or more elements of the control flows 200 and 250 described above.

For example, in some embodiments, the first and second image data may be used to determine a photogrammetric depth of an element of the setting and the potential anomaly may be identified based on a comparison of the photogrammetric depth with a scan point depth determined based on the scan point data, such as described above with respect to the control flows 200 and 250.

Further, in some embodiments, the multiple cameras may include a first camera and a second camera, where the first image data may be associated with the first camera having a first center of projection at the first time and the second image data is associated with the second camera having a second center of projection at the second time. In these or other embodiments, the first center of projection and the second center of projection may be approximately the same and identifying the potential anomaly may include detecting movement of an object in the first image data with respect to the second image data and identifying scan point data corresponding to the object as the potential anomaly, such as described above with respect to the control flows 200 and 250.

At block 304, the scan point data may be processed based on identifying the potential anomaly. In some embodiments, processing the scan point data may include removing scan point data associated with the potential anomaly, marking scan point data associated with the potential anomaly, and/or directing the laser to perform another scan of the setting.

Accordingly, the method 300 may be used to identify and/or process one or more anomalies that may be present in laser point scan data. One skilled in the art will appreciate that the functions performed in the method 300 may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

For example, in some embodiments, the method 300 may include comparing the scan point data, the first image data, and the second image data and determining that a visibility of one or more cameras of the plurality of cameras was blocked during capturing of the first image data such that an obscuration of the first image data is identified. In some of these embodiments, the method 300 may further include adjusting the scan point data using the second image data and not the first image data based on the identification of the obscuration in the first image data. Additionally, in some embodiments, adjusting the scan point data may include applying a color to scan point data associated with an element of the setting blocked in the first image data by the obscuration using the second image data but not the first image data based on the identification of the obscuration in the first image data.

Moreover, in some embodiments, the first image data and the second image data may be associated with video that may be taken during the scan. The video may be used to identify objects of the setting that are moving during the scan. In some instances, moving objects may impinge on the beam of the laser during the scan such that the associated scan point data may be compromised. Accordingly, in some embodiments, the method 300 may include determining movement of an object during a scan based on video that may be taken during the scan. It may also be determined whether or not the object impinged on the laser beam during the scan such that a potential anomaly in the corresponding scan point data may be identified. In some instances, the processing of the scan point data associated with the potential anomaly may include re-scanning the area of the setting and/or marking the corresponding scan point data as being potentially anomalous.

In these or other embodiments, the method 300 may include tracking movement of the object during the scan based on the video that is being taken and generating a warning when it appears that the moving object is about to impinge on the laser beam. The warning may be any suitable visual or audio cue to indicate such to the user. In these or other embodiments, the warning may be generated for the laser scanner. The user or the laser scanner itself may then pause the scan until the object moves out of the path of the laser such that the corresponding scan point data may not be compromised. For purposes of the present disclosure, the pausing and restarting of collection of scan point data associated with pausing and restarting of the scan may be considered a type of processing of the scan point data.

In these or other embodiments, a warning may be generated when it has been determined that the object impinged on or more likely than not impinged on the laser beam. The warning may be an audible or visual warning to the user and/or may be an instruction to the laser scanner to perform an operation based on the determination that the object impinged on or more likely than not impinged on the laser beam. In these or other embodiments, the warning may instruct the laser scanner to mark the associated scan point data as being or possibly being compromised. Further, in some embodiments, the warning may direct the user of the laser scanner to direct the laser scanner to rescan the area of the setting that may be associated with the compromised or potentially compromised scan point data. In these or other embodiments, the warning may direct the laser scanner to automatically rescan the area in response to the warning. The warning may also provide an indication of the rescan.

Additionally, in some embodiments, the video may be used to determine whether or not the laser scanner is moved (e.g., bumped or jostled) during the scan. For example, non-moving objects may be identified in the video and if those non-moving objects abruptly move in the video, it may be determined that the laser scanner moved. Movement of the laser scanner during a scan may also compromise the integrity of the scan. Therefore, in some of these embodiments, scan point data that is taken at a time that corresponds to the determined movement of the laser scanner may be identified as being potentially anomalous and treated as such.

In these or other embodiments, the video that is used to detect movement of the laser scanner may be used to correct the corresponding scan data. For example, the amount of movement of the laser scanner may be determined from the video and subsequent scan point data may be corrected based on the determined amount of movement.

Figure 4:
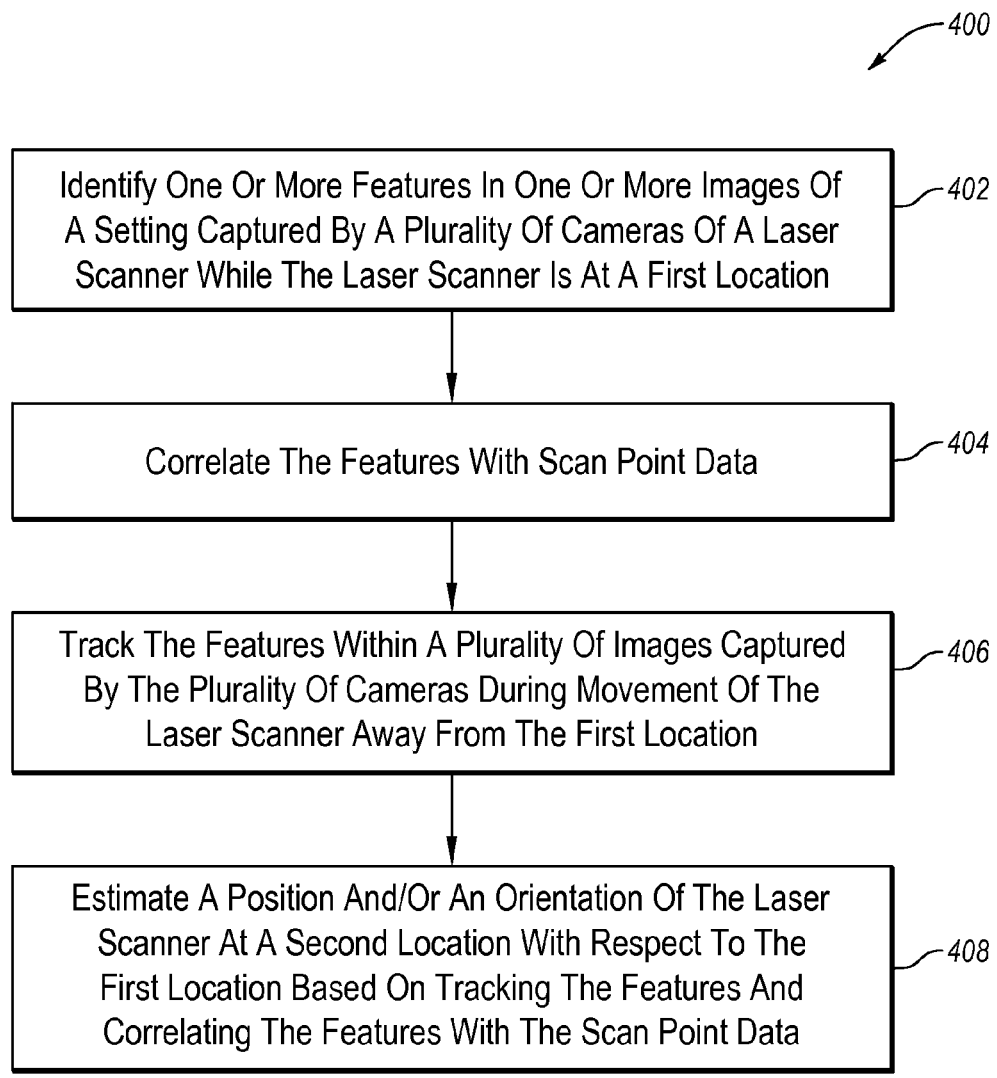
FIG. 4 is flowchart of an example method of estimating a position of a laser scanner.

FIG. 4 is flowchart of an example method 400 of estimating a position of a laser scanner, arranged in accordance with at least one embodiment described herein. The method 400 may be implemented by any suitable general-purpose or special-purpose computing device. For example, one or more elements of the method 400 may be implemented by the control system 110 of the laser scanner 100 or by the computing device 500 described below with respect to FIG. 5 in an implementation that is separate from the laser scanner 100. Although illustrated as including discrete blocks, various blocks of the method 400 may be divided into additional blocks, combined into fewer blocks, or eliminated, depending on the desired implementation.

The method 400 may begin at block 402, where one or more features in one or more images of a setting may be identified. The images may be captured by multiple cameras associated with a laser scanner while the laser scanner is at a first location, the one or more features may correspond to one or more elements in the setting. In some embodiments, the features may be associated with unique elements or elements within the setting that may stand out. In these or other embodiments, one or more of the elements that correspond to the features in the images may be placed by a user in various locations of the setting because of their contrast with the rest of the setting. Therefore, the features associated with the elements may be easily recognized and may be used to give a known frame of reference in the setting. In some embodiments, the deliberately placed elements may be marked by the user of the laser scanner (e.g., via a user interface of a control system of the laser scanner) for tracking purposes instead of or in addition to relying on automatic recognition of the features associated with the elements.

At block 404, the features in the images may be correlated with scan point data that is also associated with the one or more elements of the setting. The scan point data may be derived from a scan of the setting by a laser of the laser scanner while the laser scanner is at the first location. The correlation of the features in the images with the scan point data may be performed using any suitable technique or method. The correlation may be used to verify the positions of the elements corresponding to the features in the setting. For example, in some instances, features that are associated with scan point data may be associated with absolute positions in space, whereas features obtained without scan point data (e.g., obtained through photogrammetric analysis) may not be. Those features that have a determined position may provide a scale that may be lacking in photogrammetric analysis are referred to herein as "scaled features".

In some instances, corresponding scan point data may not be found for features that may be identified in the images, particularly in subsequent image of an image sequence that may be obtained while moving the scanner, but also in cases where the features are difficult to obtain a scan point on, for example, if the object is too distant or too darkly colored. These features may sometimes be referred to as "unsupported features" or "unscaled features". In some embodiments, the scaled features, that is, features with an estimated position in space, may be used to solve for the position of unsupported features that may not have scan data support, using any applicable method or technique. Accordingly, one or more of the unsupported or unscaled features may then be considered scaled features even though the scale may not be determined from the scan point data.

At block 406, the features within the images taken at the first location may be tracked within multiple images that may be captured by the cameras while the laser scanner is being moved away from the first location. In some embodiments, the features that may be tracked may be the scaled features. In these or other embodiments, the multiple images may be captured as a video. Additionally, in some embodiments, the multiple cameras may have a collective field-of-view that is substantially omnidirectional such that at least most of the corresponding elements of the features may be captured regardless of their placement within the setting and regardless of the orientation of the laser scanner during movement. Further, in some embodiments, the laser scanner may include one or more accelerometers, compasses, and/or GPS sensors. In these or other embodiments, readings from one or more of these components may be used to help track the features.

At block 408, a position and/or an orientation of the laser scanner may be estimated at a second location with respect to the first location based on the tracking of the features and based on the correlating of the one or more features with the scan point data. For example, during movement of the laser scanner, the laser scanner may move closer to or further away from elements within the setting associated with the features. As such, the features may change their position and size in the images depending on the movement of the laser scanner with respect to their corresponding elements. Further, the positions of these scaled or supported features in space and their corresponding location in the images may be used to estimate the relative position and orientation of the laser scanner in one or more of the images taken during movement of the laser scanner. Additionally, features that are not supported by scan data may be added to the collection of scaled features by tracking their location in the sequence of images and using the existing scaled features to solve for the location in space of the unsupported features. Therefore, by tracking the features in the images taken during movement of the laser scanner and having the position of these features, the relative position and/or orientation of the laser scanner at a second location with respect to the first location may be determined.

In some embodiments, the scaling between the first location and the second location may be resolved using a first RGBD cube map associated with the first location and/or a second RGBD cube map associated with the second location to determine the relative position and/or orientation of the laser scanner. Additionally, in some embodiments, the second location may be the location of the laser scanner at any one time while the laser scanner is being moved and is not limited to a static location of the laser scanner.

Accordingly, the method 400 may be used estimate a position and/or orientation of a laser scanner. One skilled in the art will appreciate that the functions performed in the method 400 may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

For example, the method 400 may include additional steps such as determining an approximate registration between a first scan taken at the first location and a second scan taken at the second location based on the estimated position and/or orientation of the laser scanner at the second location with respect to the first location. In these or other embodiments, the estimated registration may be refined based on a first scan-point cloud associated with the first scan and a second scan-point cloud associated with the second scan. The refining may be performed using any suitable method or technique. However, the estimated registration may help in the registration determination such that the refined registration may be improved over a registration merely obtained using a known method or technique. Additionally, by starting with an estimated registration, the registration method or technique may be faster than when an estimated registration may not be used.

Further, in some embodiments, the method 400 may include steps associated with determining an overlap between the first scan and the second scan associated with the second location based on the estimating of at least one of the position and the orientation of the second location with respect to the first location. In some of these embodiments, the method 400 may further include determining whether the overlap satisfies an overlap threshold and generating a user notification indicating whether the overlap fails to satisfy the overlap threshold.

Additionally, in some instances, when the laser scanner is being moved, one or more features may be difficult or unable to be tracked because of the movement from the first location. For example, when the laser scanner goes around a wall, many or all of the features being tracked may not be present in the images anymore. When the features are increasingly difficult to track, a certainty of the position of the laser scanner with respect to the first location may be decreased. Therefore, in some embodiments, the method 400 may also include determining a position uncertainty of the second location with respect to the first location. In these or other embodiments, the method 400 may include notifying a user when the position uncertainty has reached a threshold. The threshold in some embodiments may be based on the ability to estimate a registration between scans at the first location and a scan at a second location (which may be the current location of the laser scanner).

Moreover, in some embodiments, a photogrammetric depth map may be generated based on the tracking of the features that may be done during movement of the laser scanner. For example, using any suitable photogrammetric depth determination, a photogrammetric depth may be determined for the scaled (both original and inferred) features in the sequence of images that may be taken during movement of the laser scanner. The photogrammetric depth of the scaled features may then be used to generate the photogrammetric depth map, which may be compared with the scan point depth to identify one or more anomalies, as described above. In these and other embodiments, the photogrammetric depth map generated based on the scaled features may be augmented with the photogrammetric depth of an element of the setting that may be determined based first and second image data as described above with respect to the method 300 of FIG. 3.

Figure 5:
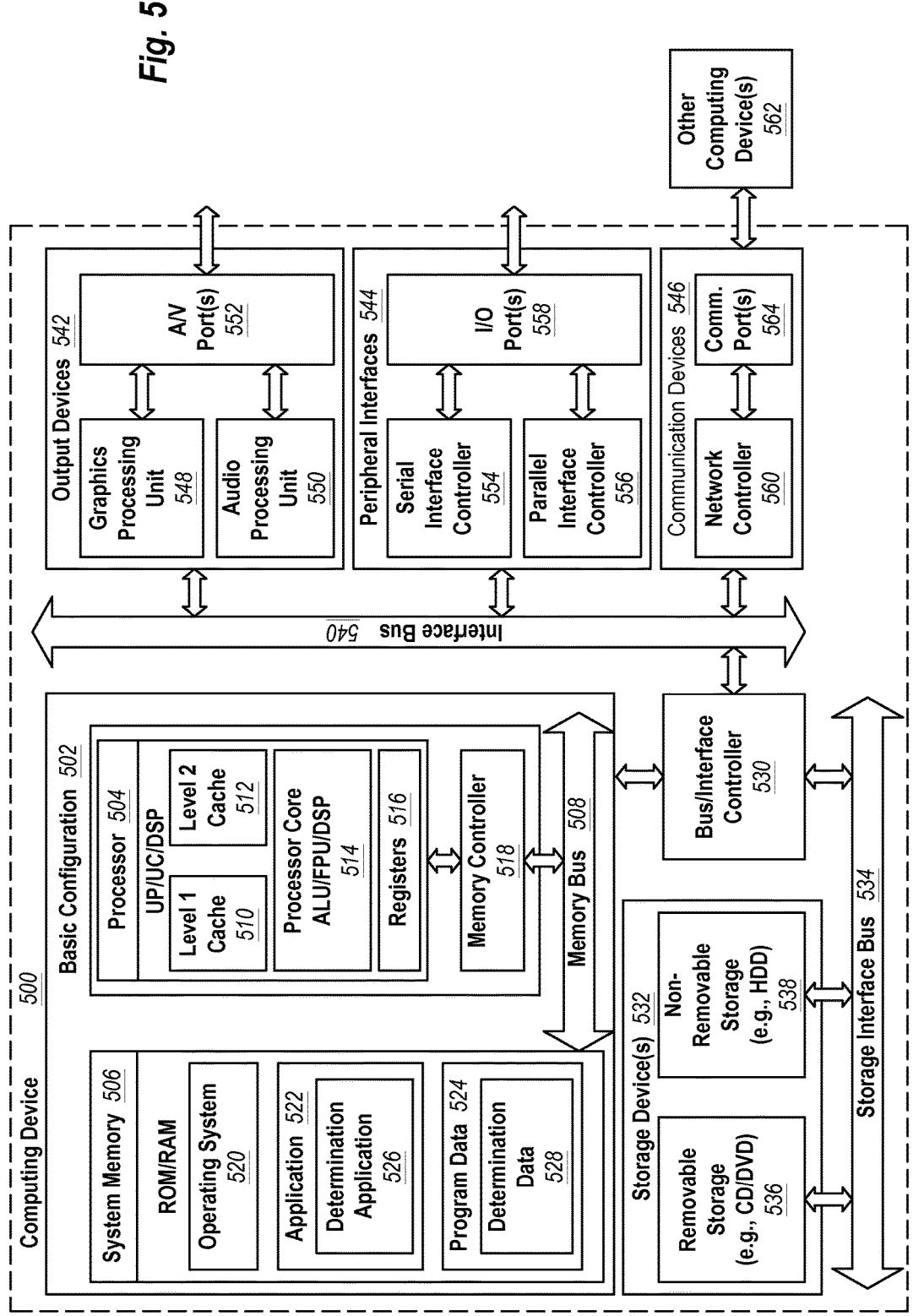
FIG. 5 is a block diagram illustrating an example computing device.

FIG. 5 is a block diagram illustrating an example computing device 500 that is arranged for performing one or more of the operations described above, according to at least one embodiment of the present disclosure. In a very basic configuration 502, the computing device 500 typically includes one or more processors 504 and a system memory 506. A memory bus 508 may be used for communicating between the processor 504 and the system memory 506.

Depending on the desired configuration, the processor 504 may be of any type including but not limited to a microprocessor (μP), a microcontroller (μC), a digital signal processor (DSP), or any combination thereof. The processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The application 522 may include one or more algorithms that are arranged to perform one or more of the operations associated with the control system 110, and/or one or more of the control flows 200 and 250 and the methods 300, and 400 described above. Additionally, the application 522 may include one Program data 524 that may be useful for performing the operations of the application 522. In some embodiments, the application 522 may be arranged to operate with program data 524 on the operating system 520 such that the operations of the application 522 may be performed. This described basic configuration 502 is illustrated in FIG. 5 by those components within the inner dashed line.

The computing device 500 may have additional features or functionality, and additional interfaces to facilitate communications between the basic configuration 502 and any required devices and interfaces. For example, a bus/interface controller 530 may be used to facilitate communications between the basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer-readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., output devices 542, peripheral interfaces 544, and communication devices 546) to the basic configuration 502 via the bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer-readable media as used herein may include both storage media and communication media.

The computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 500 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A laser scanner comprising:
 a laser configured to rotate about an azimuth axis of the laser scanner and an elevation axis of the laser scanner;
 a plurality of cameras configured to rotate about the azimuth axis and fixed with respect to the elevation axis, the plurality of cameras being configured to have a collective field-of-view that includes a collective elevation field-of-view and a collective azimuth field-of-view, the collective elevation field-of-view including at least 25% percent of a 360° elevation view about the elevation axis and the collective azimuth field-of-view that including at least 15% of a 360° azimuth view about the azimuth axis; and
 a control system configured to:
  direct the laser to rotate about the azimuth axis and the elevation axis such that the laser is configured to scan a setting; and
  direct the plurality of cameras to each begin capturing an image of the setting at substantially the same time;
 wherein a first camera of the plurality of cameras is positioned above a second camera of the plurality of cameras.

2. The laser scanner of claim 1, wherein the collective azimuth field-of-view of the plurality of cameras includes at least 75% of the 360° azimuth view.

3. The laser scanner of claim 1, wherein the collective field-of-view of the cameras is substantially omnidirectional.

4. The laser scanner of claim 1, wherein the control system is configured to direct the plurality of cameras to capture one or more images while the laser scanner is being moved.

5. The laser scanner of claim 1, wherein the control system is configured to direct the plurality of cameras to capture one or more images of the setting in conjunction with the laser performing a scan of the setting.

6. The laser scanner of claim 5, wherein the control system is configured to:
direct the plurality of cameras and the laser to rotate about the azimuth axis in conjunction with the laser performing the scan;
direct one or more of the plurality of cameras to each record a first image at a first azimuth rotational position with respect to the rotation about the azimuth axis in conjunction with the laser performing the scan; and
direct one or more of the plurality of cameras to each record a second image at a second azimuth rotational position in conjunction with the laser performing the scan.

7. The laser scanner of claim 6, wherein:
the first azimuth rotational position and the second azimuth rotational position are spaced such that a first center of projection of the first camera at the first azimuth rotational position is approximately equal to a second center of projection of the second camera at the second azimuth rotational position.

8. The laser scanner of claim 6, wherein:
the first azimuth rotational position and the second azimuth rotational position are spaced such that a first center of projection of at least one camera of the plurality of cameras at the first azimuth rotational position is offset from a second center of projection of the at least one camera at the second azimuth rotational position.

9. The laser scanner of claim 1, wherein the first camera has a different azimuthal pointing direction than the second camera.

10. The laser scanner of claim 1, wherein the first camera points upwards and the second camera points downwards.

11. The laser scanner of claim 1, wherein the plurality of cameras includes a first set of cameras and a second set of cameras, wherein each camera of the first set of cameras is positioned above a corresponding camera of the second set of cameras.

12. The laser scanner of claim 11, wherein the first set of cameras are approximately equally spaced from each other in a plane associated with rotation about the azimuth axis.

13. The laser scanner of claim 11, wherein the second set of cameras are approximately equally spaced from each other in a plane associated with rotation about the azimuth axis.

14. The laser scanner of claim 11, wherein the first set of cameras are spaced approximately 90° apart along a circle of rotation associated with rotation about the azimuth axis.

15. The laser scanner of claim 11, wherein the second set of cameras are spaced approximately 90° apart along a circle of rotation associated with rotation about the azimuth axis.

16. The laser scanner of claim 1, wherein the first camera is placed directly above the second camera so that an azimuth field-of-view of the first camera is in the same azimuth location as an azimuth field-of-view of the second camera.

17. The laser scanner of claim 1, wherein the first camera is not placed directly above the second camera so that an azimuth field-of-view of the first camera is not in the same azimuth location as an azimuth field-of-view of the second camera.

18. The laser scanner of claim 1, wherein the collective elevation field-of-view includes at least 75% of the 360° elevation view about the elevation axis.

19. The laser scanner of claim 1, wherein the plurality of cameras are disposed on a first portion and a second portion of the laser scanner, the first portion and the second portion being configured to rotate about the azimuth axis.

20. The laser scanner of claim 1, wherein the control system is configured to direct the plurality of cameras and the laser to rotate about the azimuth axis in conjunction with the laser performing the scan.

21. The laser scanner of claim 1, wherein the control system is configured to direct one or more of the plurality of cameras to each record a first image at a first azimuth rotational position with respect to the rotation about the azimuth axis in conjunction with the laser performing the scan.

22. The laser scanner of claim 21, wherein the control system is configured to direct one or more of the plurality of cameras to each record a second image at a second azimuth rotational position in conjunction with the laser performing the scan.

23. A laser scanner comprising:
a laser configured to rotate about an azimuth axis of the laser scanner and an elevation axis of the laser scanner;
a plurality of cameras configured to rotate about the azimuth axis and fixed with respect to the elevation axis, the plurality of cameras being configured to have a collective field-of-view that includes a collective elevation field-of-view and a collective azimuth field-of-view, the collective elevation field-of-view including at least 25% percent of a 360° elevation view about the elevation axis and the collective azimuth field-of-view that including at least 15% of a 360° azimuth view about the azimuth axis; and
a control system configured to:
direct the laser to rotate about the azimuth axis and the elevation axis such that the laser is configured to scan a setting; and
direct the plurality of cameras and the laser to rotate about the azimuth axis in conjunction with the laser performing the scan;
direct one or more of the plurality of cameras to each record a first image at a first azimuth rotational position with respect to the rotation about the azimuth axis in conjunction with the laser performing the scan; and
direct one or more of the plurality of cameras to each record a second image at a second azimuth rotational position in conjunction with the laser performing the scan;
wherein a first camera of the plurality of cameras is positioned above a second camera of the plurality of cameras.

* * * * *